(12) United States Patent
Tanaka et al.

(10) Patent No.: US 8,985,257 B2
(45) Date of Patent: Mar. 24, 2015

(54) PEDESTRIAN AIRBAG APPARATUS

(71) Applicant: Toyoda Gosei Co., Ltd., Kiyosu-shi, Aichi-ken (JP)

(72) Inventors: Akimitsu Tanaka, Kiyosu (JP); Yasushi Masuda, Kiyosu (JP); Yuji Matsuzaki, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 14/174,883

(22) Filed: Feb. 7, 2014

(65) Prior Publication Data

US 2014/0291055 A1 Oct. 2, 2014

(30) Foreign Application Priority Data

Mar. 29, 2013 (JP) ................................. 2013-072917

(51) Int. Cl.
*B60R 21/00* (2006.01)
*B60R 21/36* (2011.01)
*B60R 21/237* (2006.01)

(52) U.S. Cl.
CPC ............... *B60R 21/36* (2013.01); *B60R 21/237* (2013.01)
USPC ....................................... 180/274; 280/743.1

(58) Field of Classification Search
CPC .............................. B60R 21/36; B60R 21/237
USPC ....................................... 180/274; 280/743.1
See application file for complete search history.

(56) References Cited

U.S. PATENT DOCUMENTS

| | | | |
|---|---|---|---|
| 6,739,622 B2 * | 5/2004 | Halford et al. | 280/743.1 |
| 6,923,286 B2 * | 8/2005 | Sato et al. | 180/274 |
| 7,527,121 B2 * | 5/2009 | Kitte et al. | 180/274 |
| 7,584,988 B2 * | 9/2009 | Okamoto et al. | 280/730.1 |
| 2007/0023223 A1 * | 2/2007 | Okamoto et al. | 180/274 |
| 2010/0300793 A1 * | 12/2010 | Hallneus et al. | 180/274 |

FOREIGN PATENT DOCUMENTS

| | | | |
|---|---|---|---|
| JP | 2006-069291 A | | 3/2006 |
| JP | 2006264386 A | * | 10/2006 |
| JP | 2006327360 A | * | 12/2006 |
| JP | 2009101796 A | * | 5/2009 |

* cited by examiner

*Primary Examiner* — James English
(74) *Attorney, Agent, or Firm* — Posz Law Group, PLC

(57) ABSTRACT

A pedestrian airbag apparatus received in a storage portion of a vehicle between a left front pillar and a right front pillar. The pedestrian airbag apparatus includes an air bag and an inflator. The airbag protrudes from the storage portion when an inflation of the air bag is started and includes a traversal inflation portion that is formed in a generally rod-shape extending along a left and right direction of a lower portion of a front wind shield which is arranged on a rear side of the hood panel in a state where the inflation of the air bag is completed, and two longitudinal inflation portions that are formed in a shape extending rearward from both ends of the transversal inflation portion in the left and right direction to cover front surfaces of the left and right front pillars.

1 Claim, 15 Drawing Sheets

PEDESTRIAN AIRBAG APPARATUS

CROSS REFERENCE TO RELATED APPLICATION

This application is based on Japanese Patent Application No. 2013-072917 filed on Mar. 29, 2013, the contents of which are incorporated herein by reference.

BACKGROUND OF THE INVENTION

1. Technical Field

The present invention relates to an a pedestrian airbag apparatus, which is arranged near a rear end of a hood panel and has an airbag adapted to cover a part extending from an upper surface of a cowl, which is arranged on a rear side of the hood panel, to front surfaces of left and right front pillars upon completion of inflation.

2. Background Art

Conventionally, as a pedestrian airbag apparatus, which has an airbag including a generally rod-shaped transversal inflation portion extending substantially along a left and right direction to cover an upper surface of a cowl and two longitudinal inflation portions extending rearward from both ends of the transversal inflation portion to cover front surfaces of left and right front pillars, one is known in which the airbag is folded by roll-folding to roll a region of the transversal inflation portion, except for a front edge section thereof which is an upstream section in a stream of an inflation gas discharged from an inflator, from a distal end of the longitudinal inflation portions toward a lower surface side, and then by wrapping the region of the upstream section of the transversal inflation portion around the roll-folded section (e.g., see JP-A-2006-069291).

According to the conventional pedestrian airbag apparatus, in a state where the folded airbag is received in a case, the upstream section isolates an upper wall portion, which is adapted to be arranged on an upper surface side upon completion of inflation, from a lower wall portion, which is adapted to be arranged on a lower surface side, and also is arranged to cover an upper side and a rear side of the roll-folded section disposed therebetween. At initial inflation, the upstream section of the transversal inflation portion is inflated as the inflation gas is flowed thereinto, and at the same time, pushes out the roll-folded section from a protrusion opening of the case.

However, in the conventional pedestrian airbag apparatus, because the transversal inflation portion is folded by roll-folding all the region thereof, except for the upstream section, there is a problem in that the roll-folded section is interfered with wipers, which is arranged to protrude from the cowl arranged on the rear side of the storage portion, and thus does not be quickly deployed, when, at initial inflation of the airbag, the upstream section is inflated as the inflation gas from the inflator is flowed thereinto and thus pushes out the roll-folded section from the storage portion.

Accordingly, in order to solve the above problems, an object of the present invention is to provide a pedestrian airbag apparatus, in which an airbag can be quickly and stably inflated.

SUMMARY OF THE INVENTION

According to an aspect of the invention, a pedestrian airbag apparatus received in a storage portion arranged near a rear end of a hood panel of a vehicle in the middle area in a left and right direction between a left front pillar and a right front pillar. The pedestrian airbag apparatus includes an air bag that is folded and an inflator that supplies an inflation gas to the airbag. The airbag protrudes from the storage portion when an inflation of the air bag is started and includes a traversal inflation portion that is formed in a generally rod-shape extending along a left and right direction of a lower portion of a front wind shield which is arranged on a rear side of the hood panel in a state where the inflation of the air bag is completed, and two longitudinal inflation portions that are formed in a shape extending rearward from both ends of the transversal inflation portion in the left and right direction to cover front surfaces of the left and right front pillars. The inflator is connected to the vicinity of a front end of the transversal inflation portion. The airbag includes a lower wall portion arranged on a lower surface side thereof in the state where the inflation of the airbag is completed and an upper wall portion arranged on an upper surface side thereof in the state where the inflation of the airbag is completed, formed in a sack shape. The lower wall portion has substantially the same exterior shape as the upper wall portion. The airbag is folded from a flatly deployed state, in which the upper wall portion is overlapped with the lower wall portion, to be receivable in the storage portion, by folding in a front and rear direction for reducing a width dimension thereof in the front and rear direction, and by folding in the left and right direction for reducing a width dimension thereof in the left and right direction. In the transversal inflation portion, the middle part in the left and right direction of a front edge side thereof upon completion of inflation is constituted as an upstream section in a stream of the inflation gas discharged from the inflator. During the folding in the front and rear direction of the airbag, the transversal inflation portion is folded by roll-folding to roll a rear edge section thereof from a rear end of the airbag in the state where the inflation of the airbag is completed toward the lower wall portion, accordion-folding a part thereof between the upstream section and the rear edge section to form fold lines substantially along the left and right direction, arranging the accordion-folded section in front of the roll-folded section formed by roll-folding, and then folding back the upstream section to form fold lines substantially along the left and right direction and thus to be arranged at a location covering lower sides of the accordion-folded section and the roll-folded section.

According to the pedestrian airbag apparatus of the present invention, the inflation gas discharged from the inflator is firstly flowed into the upstream section of the transversal inflation portion. Because the upstream section is received in the storage portion to be arranged at a location covering the lower sides of the roll-folded section and the accordion-folded section, upon initial inflation of the airbag, the upstream section is firstly inflated by the inflation gas flowed thereinto and then pushes out the roll-folded section and the accordion-folded section, so that the roll-folded section and the accordion-folded section protrude greatly from the storage portion. Also, according to the pedestrian airbag apparatus of the invention, the rear edge section of the transversal inflation portion is roll-folded to be rolled from the rear end upon completion of inflation toward the lower wall portion, the part thereof between the upstream section and the rear edge section is accordion-folded to form the fold lines substantially along the left and right direction, and also, the accordion-folded section is arranged in front of the roll-folded section (between the roll-folded section and the upstream section). Therefore, after being pushed out from the storage portion by the upstream section, the accordion-folded section is deployed to release the folded state thereof, thereby further pushing out the roll-folded section rearward and upward. As a result, even if wipers arranged to protrude upward from a cowl are disposed adjacent to the rear side of the storage portion, the roll-folded section can protrude to go over the wipers, thereby preventing interference with the wipers. Therefore, the roll-folded section can be prevented from being interfered with the wipers, and thus be smoothly deployed and inflated to release the folded state thereof.

Therefore, according to the pedestrian airbag apparatus of the present invention, the airbag can be quickly and stably inflated.

Further, according to the pedestrian airbag apparatus of the present invention, because the transversal inflation portion is folded by accordion-folding the middle part thereof in the front and rear direction, the transversal inflation portion is quickly deployed to release the folded state thereof, after protruding from the storage portion, and also the transversal inflation portion elongated in the left and right direction can quickly deployed, without being twisted, over the substantially entire region in the left and right direction, thereby releasing the folded state thereof. Therefore, the transversal inflation portion can be prevented from being twisted in parts near the longitudinal inflation portions, which are disposed on both left and right end sides thereof, and thus the longitudinal inflation portions can be also quickly deployed and inflated.

DESCRIPTION OF PREFERRED EMBODIMENT

Figure 1:
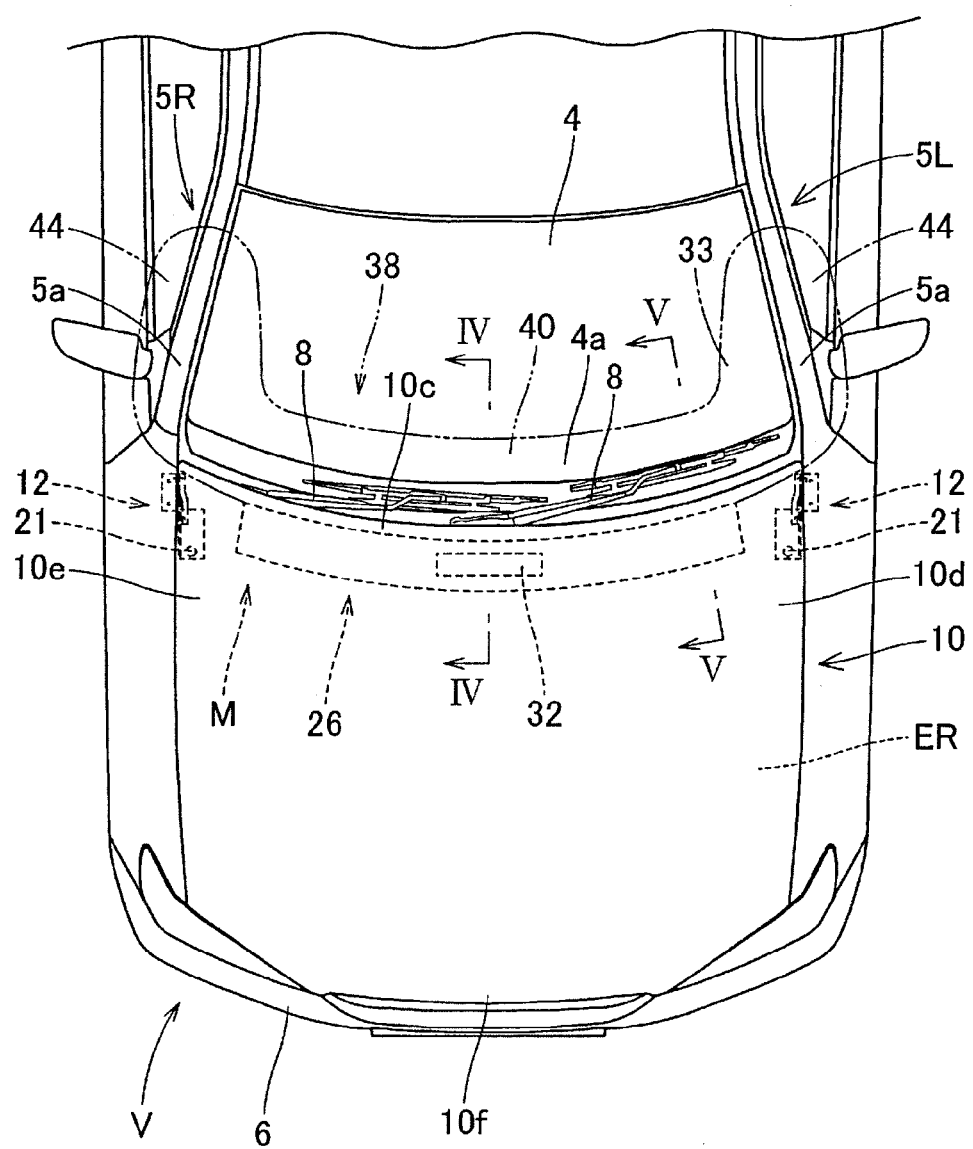
FIG. 1 is a plan view showing a vehicle, in which a pedestrian airbag apparatus according to one embodiment of the present invention is mounted.

One embodiment of the present invention will be now described with reference to the accompanying drawings. As shown in FIG. 1, a pedestrian airbag apparatus M of the embodiment (hereinafter, also simply referred to as the 'airbag apparatus') is arranged at a location on a rear end 10c side of a hood panel 10 of a vehicle V, which corresponds to the middle side in a left and right direction between left and right pillars 5L and 5R. Herein, unless otherwise specified, front and rear, upward and downward, and left and right directions will be respectively described to correspond to front and rear, upward and downward, and left and right directions of the vehicle V.

Figure 12A:
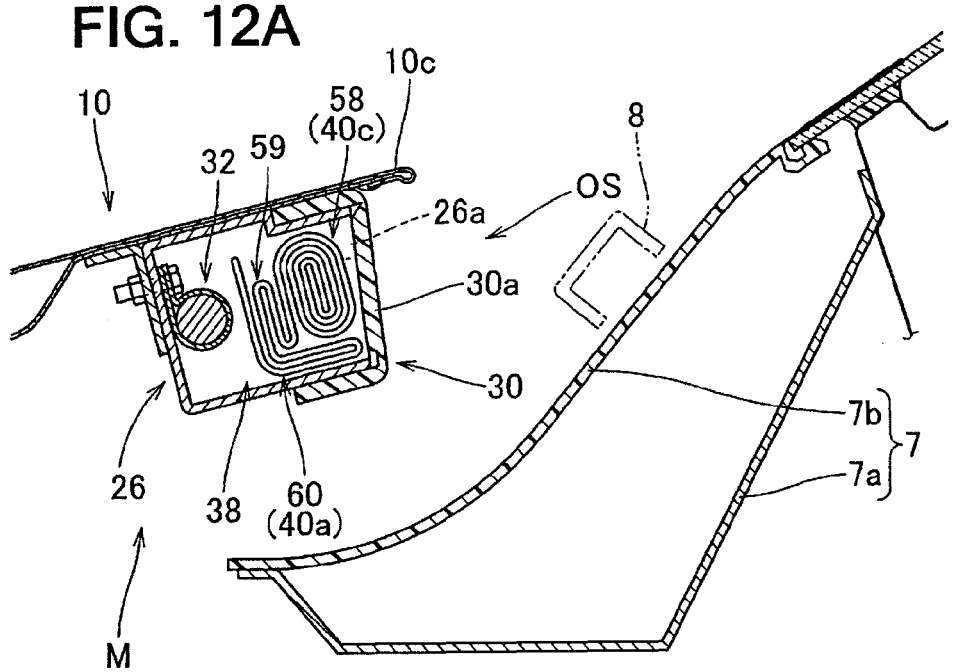
FIGS. 12A and 12B are longitudinal sectional views explaining a procedure of inflating the airbag of the pedestrian airbag apparatus according to the embodiment.

The embodiment is configured such that a front bumper of the vehicle V (see FIG. 1) has a sensor (not shown) installed therein for detecting a collision with a pedestrian and an actuation circuit (not shown), into which a signal from the sensor is inputted, actuates an inflator 32 of the airbag apparatus M when detecting that the vehicle V is collided with a pedestrian, based on the signal from sensor. Also, in the vehicle V of the embodiment, actuators 21 are installed on a left edge 10d and a right edge 10e of the hood panel 10 near a rear end 10c thereof for pushing up the rear end 10c of the hood panel 10. When a collision of the vehicle V with a pedestrian is detected by the actuation circuit, the actuators 21 are actuated substantially at the same time as actuation of the inflator 32 to push up the rear end 10c of the hood panel 10, so that a gap OS allowing the airbag to protrude out is formed between the rear end 10c of the hood panel 10 and a cowl 7 (see FIG. 12A).

Figure 3:
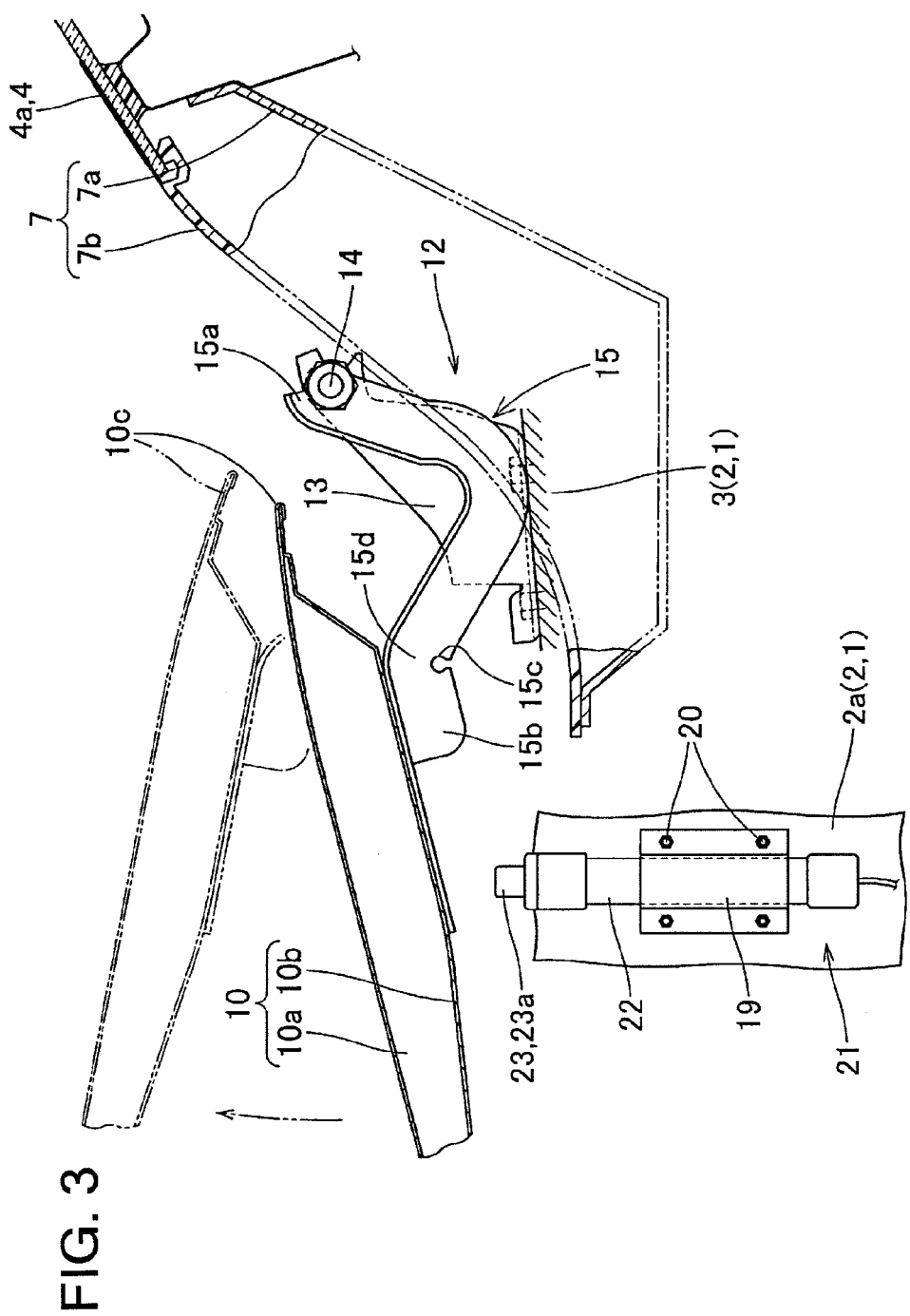
FIG. 3 is a longitudinal sectional view schematically showing an actuator part of the vehicle, in which the pedestrian airbag apparatus according to the embodiment is mounted, corresponding to a section taken along a line III-III in FIG. 2.
Figure 4:
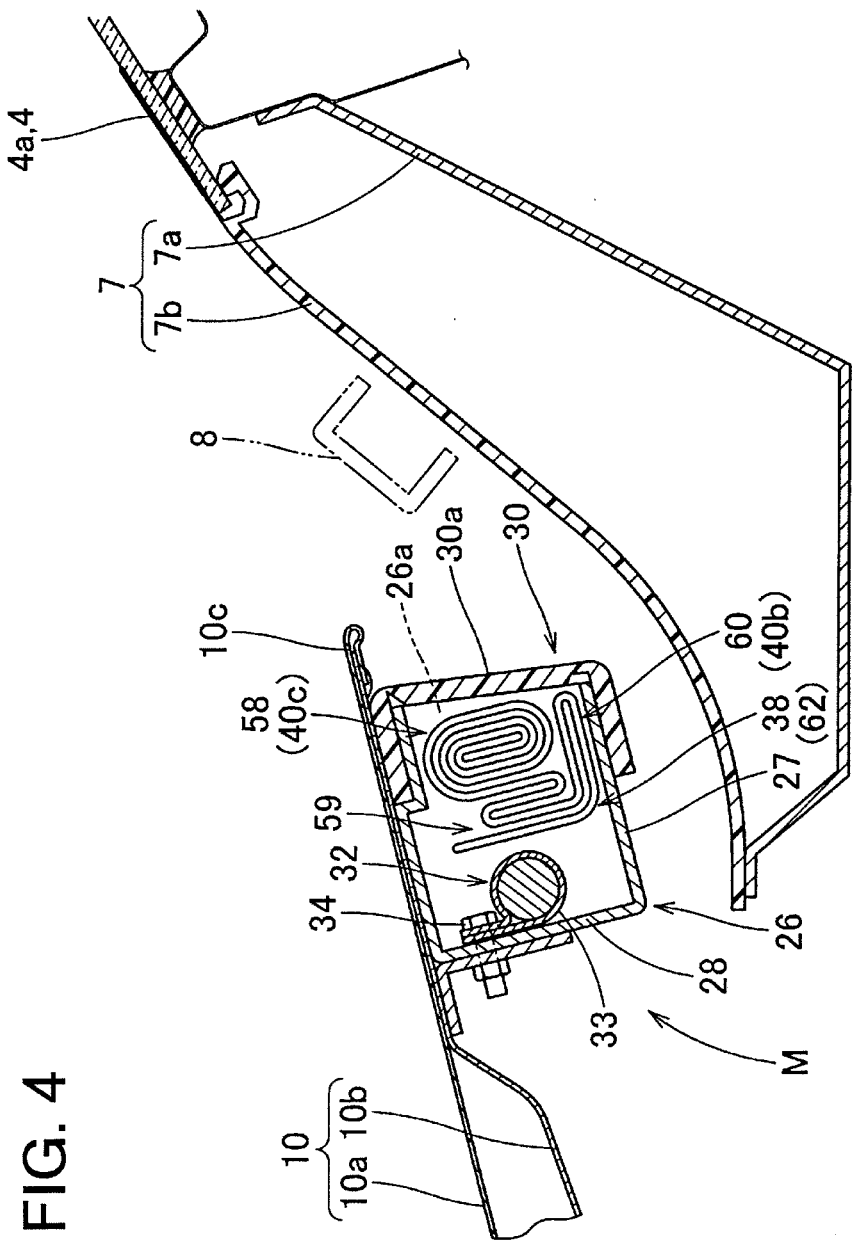
FIG. 4 is a longitudinal sectional view schematically showing the pedestrian airbag apparatus according to the embodiment in a vehicle front and rear direction, corresponding to a section taken along a line IV-IV in FIG. 1.
Figure 5:
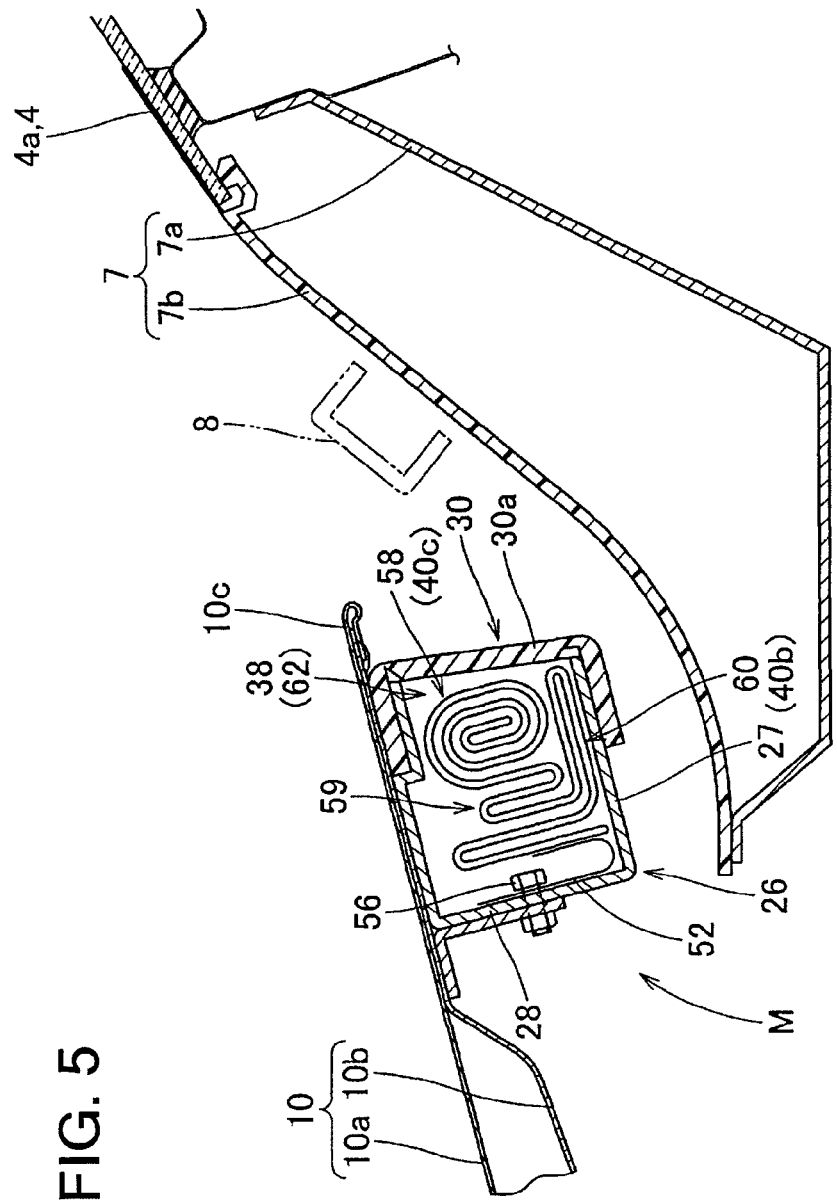
FIG. 5 is a longitudinal sectional view schematically showing the pedestrian airbag apparatus according to the embodiment in the vehicle front and rear direction, corresponding to a section taken along a line V-V in FIG. 1.

As shown in FIG. 1, the hood panel 10 is installed to cover an upper side of an engine room ER of the vehicle V, and is openably connected to a body 1 of the vehicle V by hinge portions 12 arranged near rear ends of both edges thereof in the left and right direction, to be opened forward. In the embodiment, the hood panel 10 is made of a plate material, such as aluminum (aluminum alloy), and, as shown in FIGS. 3 to 5, is constituted of an outer panel 10a located on an upper surface side thereof and an inner panel 10b located on an lower surface side thereof and having a strength improved more than that of the outer panel 10a. The hood panel 10 is curved in the left and right direction to conform to a curved shape of a front pillar shield 4 as described below, so that, as shown in FIG. 1, the middle of the rear end 10c in the left and right direction is located on the front side and both left and right ends thereof are located on the rear side. As shown in FIGS. 3 to 5, a cowl 7 is installed on the rear side of the hood panel 10, and the cowl 7 is constituted of a cowl panel 7a located toward the body 1 and having high rigidity, and a cowl rubber 7b located above the cowl panel 7a and made of a synthetic resin. The cowl rubber 7b is installed such that a rear end thereof is connected to a lower portion 4a of the front pillar shield 4. Similarly, the cowl 7 is also curved in the left and right direction to conform to the curved shape of the rear end 10c of the hood panel 10, so that the middle thereof in the left and right direction is located on the front side and both left and right ends thereof are located on the rear side. Also, as shown in FIG. 1, two wipers 8 and 8 are installed on a region of the cowl 7. As shown by a two-dot chain line in FIG. 4, the wipers 8 are installed at a location close to a rear side of a case 26 to protrude from the cowl rubber 7b upward. A lower edge of the front pillar shield 4 is curved in the left and right direction, so that the middle thereof in the left and right direction is located on the front side and both left and right ends thereof are located on the rear side. As shown in FIG. 1, front pillars 5L and 5R are respectively installed on left and right outsides of the front pillar shield 4. Upon actuation of the actuators 21, the hood panel 10 can push up the rear end 10c (see FIG. 11), but during a raising movement of the rear end 10c, a front end 10f of the hood panel 10 is never moved away from the body due to a latch mechanism for locking a hood lock striker (not shown), which is disposed at the front end 10f and is normally closed.

Figure 2:
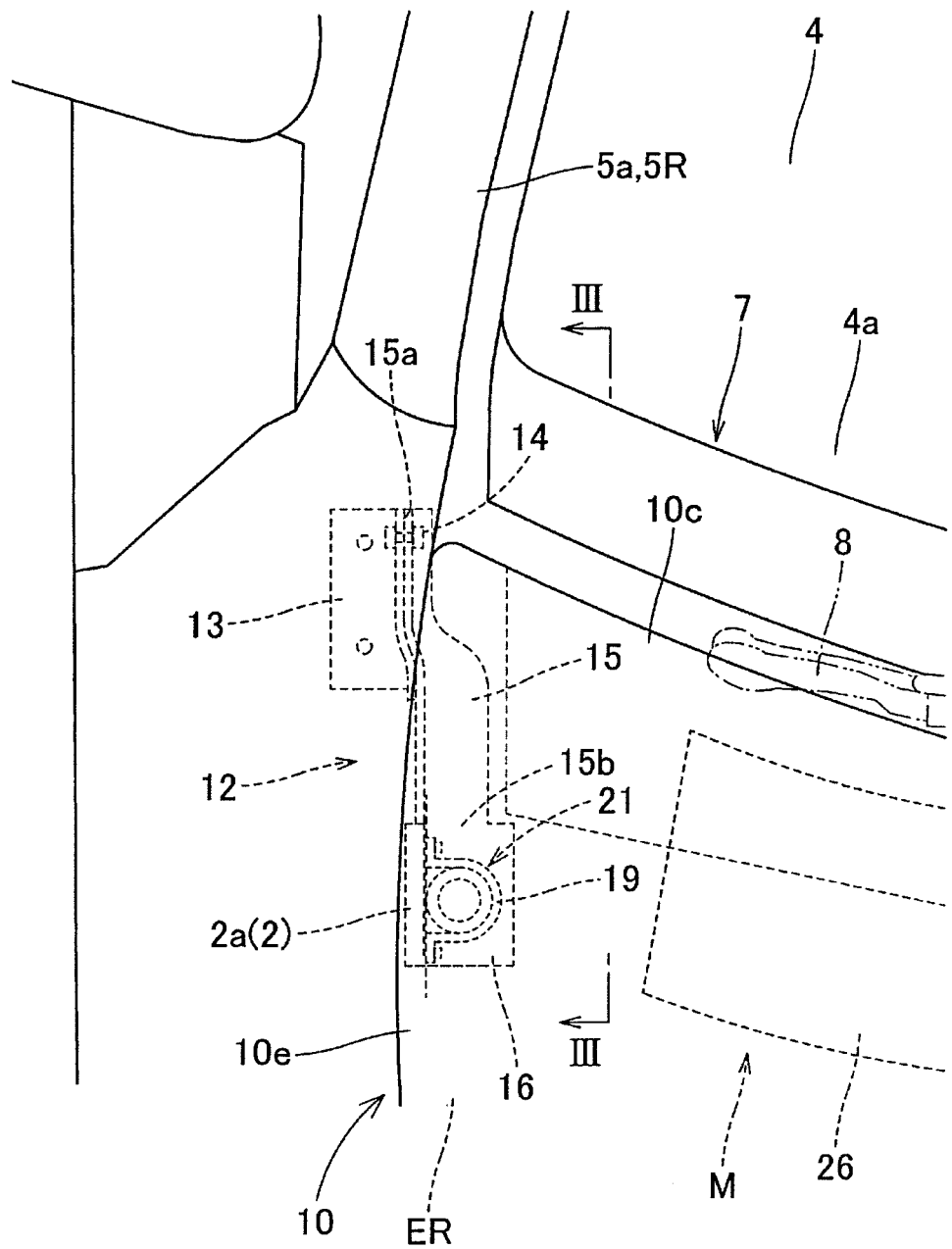
FIG. 2 is a partially enlarged plan view showing a rear end and left edge side of a hood panel of the vehicle, in which the pedestrian airbag apparatus according to the embodiment is mounted.
Figure 15:
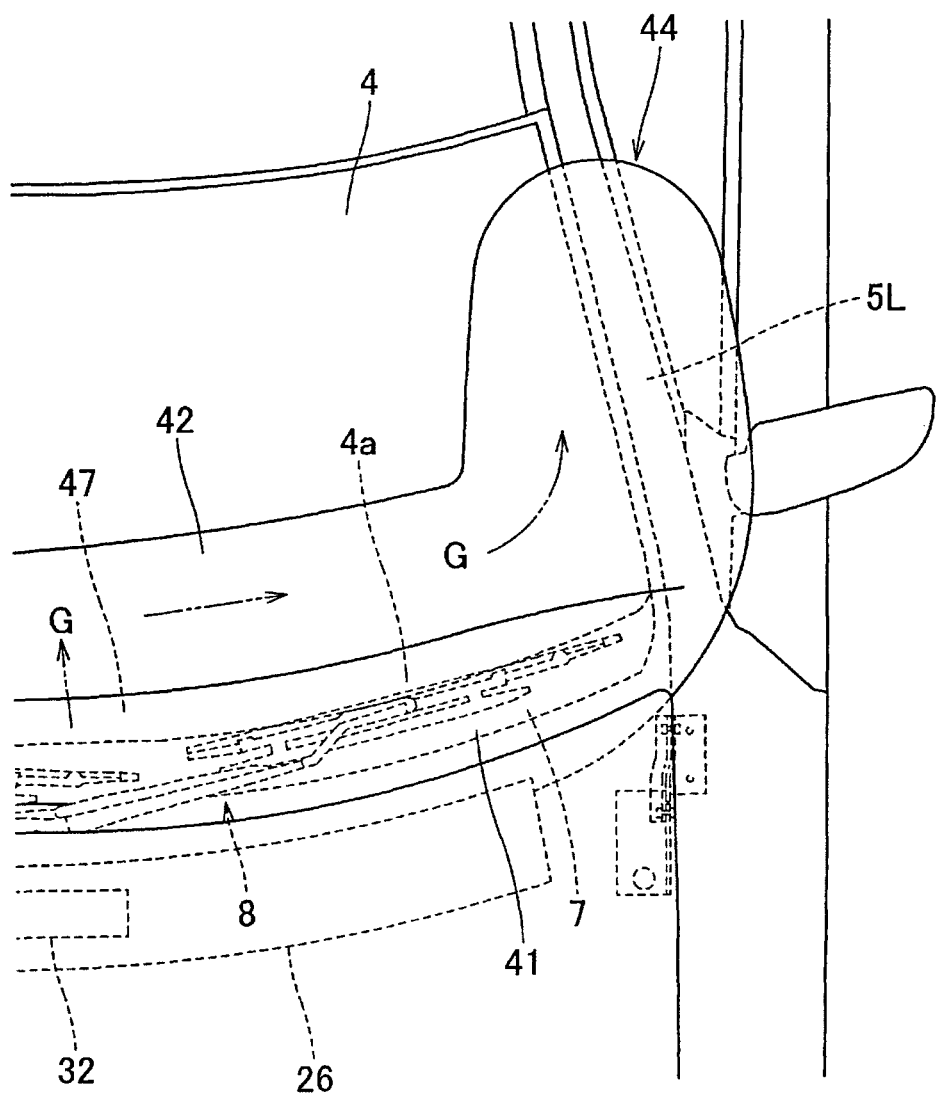
FIG. 15 is a partially enlarged plan view showing a state where the airbag of the pedestrian airbag apparatus according to the embodiment has been completely inflated.

The hinge portions 12 are respectively installed on a left edge 10d and a right edge 10e of the rear end 10c of the hood panel 10 (see FIGS. 1 and 2), and each includes a hinge base 13 fixed to an attachment flange 3 connected to a hood ridge reinforcement 2, which is a member on the body 1, and a hinge arm 15 fixed to the hood panel 10 (see FIGS. 2 and 3). As shown in FIG. 15, each of hinge arms 15 is configured as a curved shape by curving an angle material made of a sheet metal in a generally semicircular arc shape to protrude downward, and a root end 15a thereof located toward the hinge base 13 is pivotally connected to the hinge base 13 using a support shaft 14. Also, as shown in FIGS. 2 and 3, each of hinge arms 15 has, on a distal end 15a thereof spaced from the root end 15a, a connection plate portion 16 extending from the distal end 15b to extend substantially along the lower surface of the hood panel 10, and the connection plate portion 16 is coupled to the lower surface side of the rear end 10c of the hood panel 10 by welding or the like. In addition, as shown in FIG. 3, notched recesses 15c are formed near the distal ends 15b of the hinge arms 15 by notching lower edges thereof in a generally circular shape. Regions around the notched recesses 15c are plastic deformation portions 15d to be plastically deformed when piston rods 23 push up the rear end 10c of the hood panel 10 upon actuation of the actuators 21, thereby allowing raising of the rear end 10c of the hood panel 10 (see FIG. 11). As shown in FIGS. 2 and 3, each of support shafts 14 is arranged such that an axial direction thereof extends along the left and right direction of the vehicle V. When the hood panel 10 is opened, if the front end 10f (see FIG. 1) of the hood panel 10 is raised to be opened forward, the hood panel 10 can be opened about each of support shafts 14 as a rotation center to be opened forward (cf., a two-dot chain line in FIG. 3).

Figure 11:
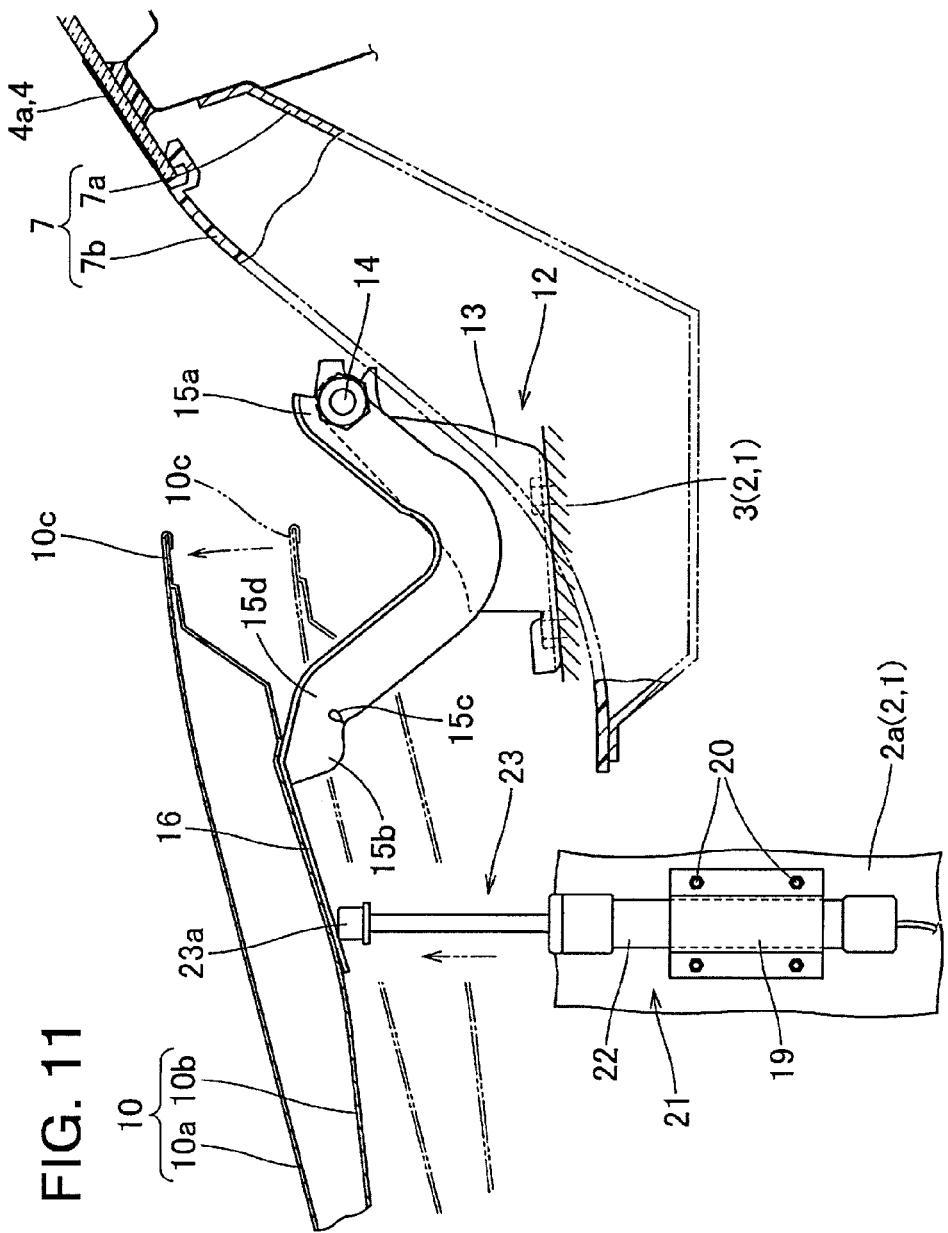
FIG. 11 is a longitudinal sectional view showing when an actuator in the vehicle, in which the pedestrian airbag apparatus according to the embodiment is mounted, is operated.

As shown in FIGS. 1 and 2, the actuators 21 are arranged at locations corresponding to both left and right sides of the airbag apparatus M (the case 26). Specifically, each of actuators 21 is held by a generally U-cross-sectional shaped attachment bracket 19, which is fixed by bolts 20 to the attachment flange 2a connected to the hood ridge reinforcement 2, and is installed below each of the hinge portions 12, which corresponds to below the left edge 10d and the right edge 10e of the rear end 10c of the hood panel 10 (see FIGS. 2 and 3). In particular, each of actuators 21 uses a gas generator (not shown) as a drive source, and includes a cylinder 22 and the piston rod 23 installed to protrude from the cylinder 22 upward. Each of the actuators 21 is configured such that an actuation gas, which is generated by actuating the gas generator (not shown) contained inside a lower end side of the cylinder 22, pushes up a piston (not shown) of the piston rod 23 contained in the cylinder 22, thereby raising the piston rod 23. Upon actuation of the actuators 21, upper ends 23a of the raising piston rods 23 are abutted to lower surfaces of the connection plate portions 16 provided on the distal ends 15b of the hinge arms 15, which are installed on the lower surface side of the rear end 10c of the hood panel 10. Due to the upper ends 23a of the raising piston rods 23, the rear end 10c of the hood panel 10, as shown in FIG. 11, is pushed upward, so that the gap OS allowing the inflating airbag 38 to protrude out is formed between the cowl 7 and the rear end 10c of the hood panel 10 (see FIGS. 12 to 14).

As shown in FIGS. 1, 4 and 5, the airbag apparatus M includes the airbag 38, the inflator 32 for supplying an inflation gas to the airbag 38, the case 26 as a storage portion for containing the airbag 38 and the inflator 32, and an airbag cover 32 for covering the folded airbag 38.

In the embodiment, the case 26 as the storage portion, which is made of a sheet metal and, as shown in FIGS. 4 and 5, is formed in a generally box shape having a generally rectangular-barrel-shaped peripheral wall portion 27, which is arranged such that an axial direction thereof extends substantially along the front and rear direction and is opened toward the rear side of the vehicle, and a bottom wall portion 28 adapted to close a frond end side of the peripheral wall portion 27, and allows the inflating airbag 38 to protrude out through a protrusion opening 26a on a rear end side thereof. In the embodiment, the case 26 is directly connected to the lower surface of the hood panel 10, which is located on the rear end 10 side of the hood panel 10, using brackets (the reference numeral thereof is omitted). The case 26 is arranged in an elongated shape substantially along the left and right direction at a location on the rear end 10c side of the hood panel 10, which corresponds to the middle side in the left and right direction between the left and right pillars 5L and 5R. In the embodiment, the case 26, as shown in FIG. 1, is curved in the left and right direction to conform to the curved shape of the rear end 10c of the hood panel 10, so that, the middle thereof in the left and right direction is located on the front side and both left and right ends thereof are located on the rear side. In the embodiment, the case 26 is configured such that the left and right ends thereof are arranged near the inner side of the lower portion of the front pillars 5L and 5R (see FIGS. 1 and 2).

The airbag cover 40, which is made of a synthetic resin, as shown in FIGS. 4 and 5, is installed to cover the protrusion opening 26a of the case 26 and includes a door portion 30a which can be pushed and opened by the airbag 38 upon deployment and inflation of the airbag 38.

As shown in FIGS. 1 and 4, the inflator 32 is arranged such that an axial direction thereof extends substantially along the left and right direction and thus an exterior shape thereof is of a cylinder type having a generally circular cylindrical shape. Also, the inflator 32 is provided, on one end side (in the embodiment, the right end side) thereof in the left and right direction, with a gas outlet (not shown) which can discharge the inflation gas, and is electrically connected to the actuation circuit via a lead (not shown). As shown in FIG. 4, the inflator 32 is attached to the bottom wall portion 28 by fixing a retainer 33, which is arranged to cover an outer periphery thereof, to the bottom wall portion 28 of the case 26 by a bolt 34. In addition, the inflator 32 is adapted such that the right end side thereof having the gas outlet (not shown) is connected to a gas inlet 45 (described below) of the airbag 38, using a clamp 35 (cf., a two-dot chain line in FIG. 6).

Figure 6:
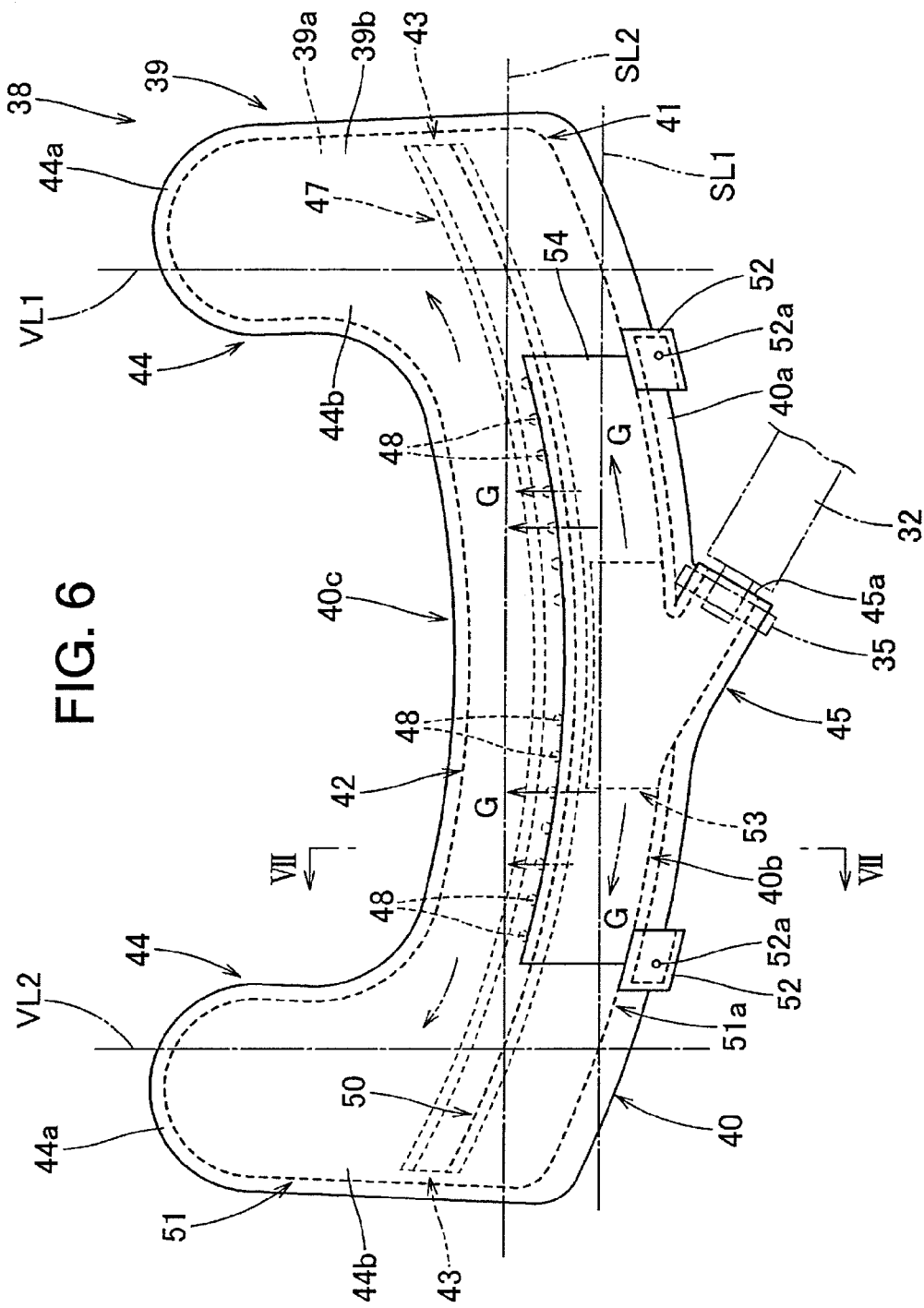
FIG. 6 is a plan view showing a state where an airbag used in the pedestrian airbag apparatus according to the embodiment is flatly deployed.
Figure 7:
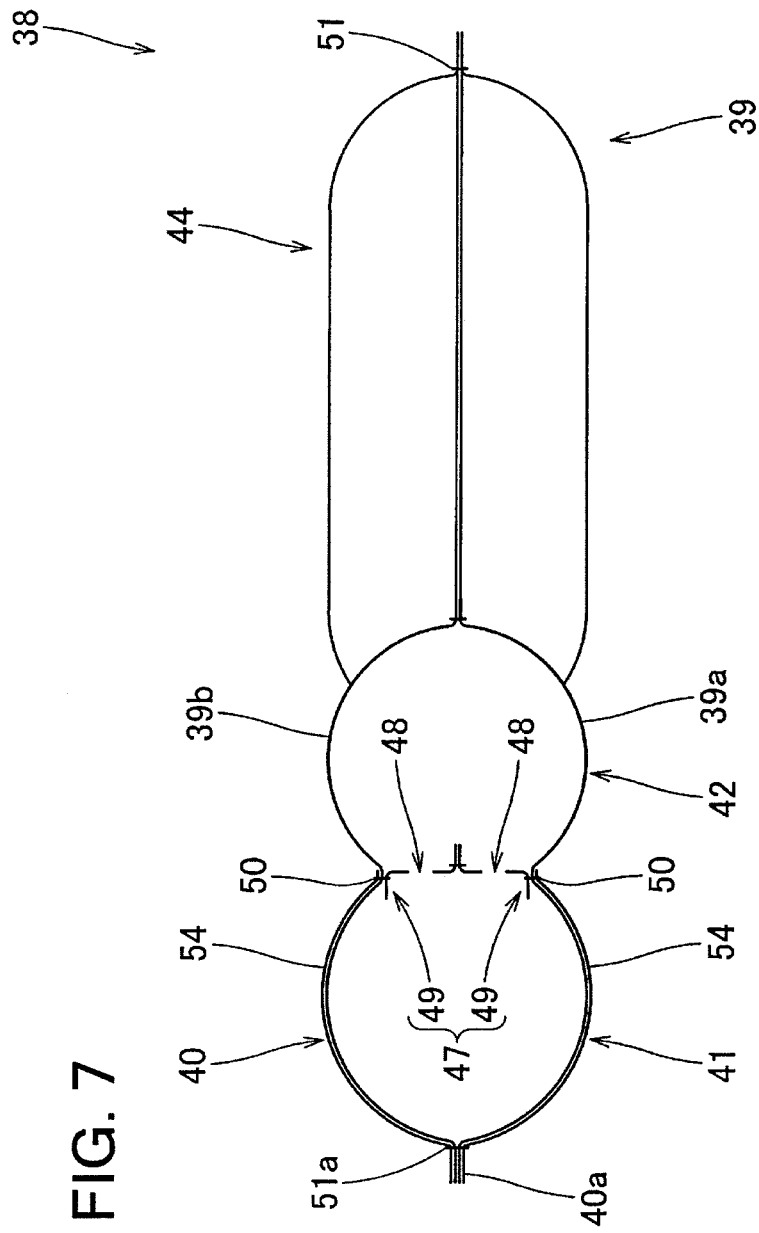
FIG. 7 is a sectional view showing a state where the airbag of FIG. 6 is inflated as a single body, corresponding to a section taken along a line VII-VII in FIG. 6.
Figure 8:
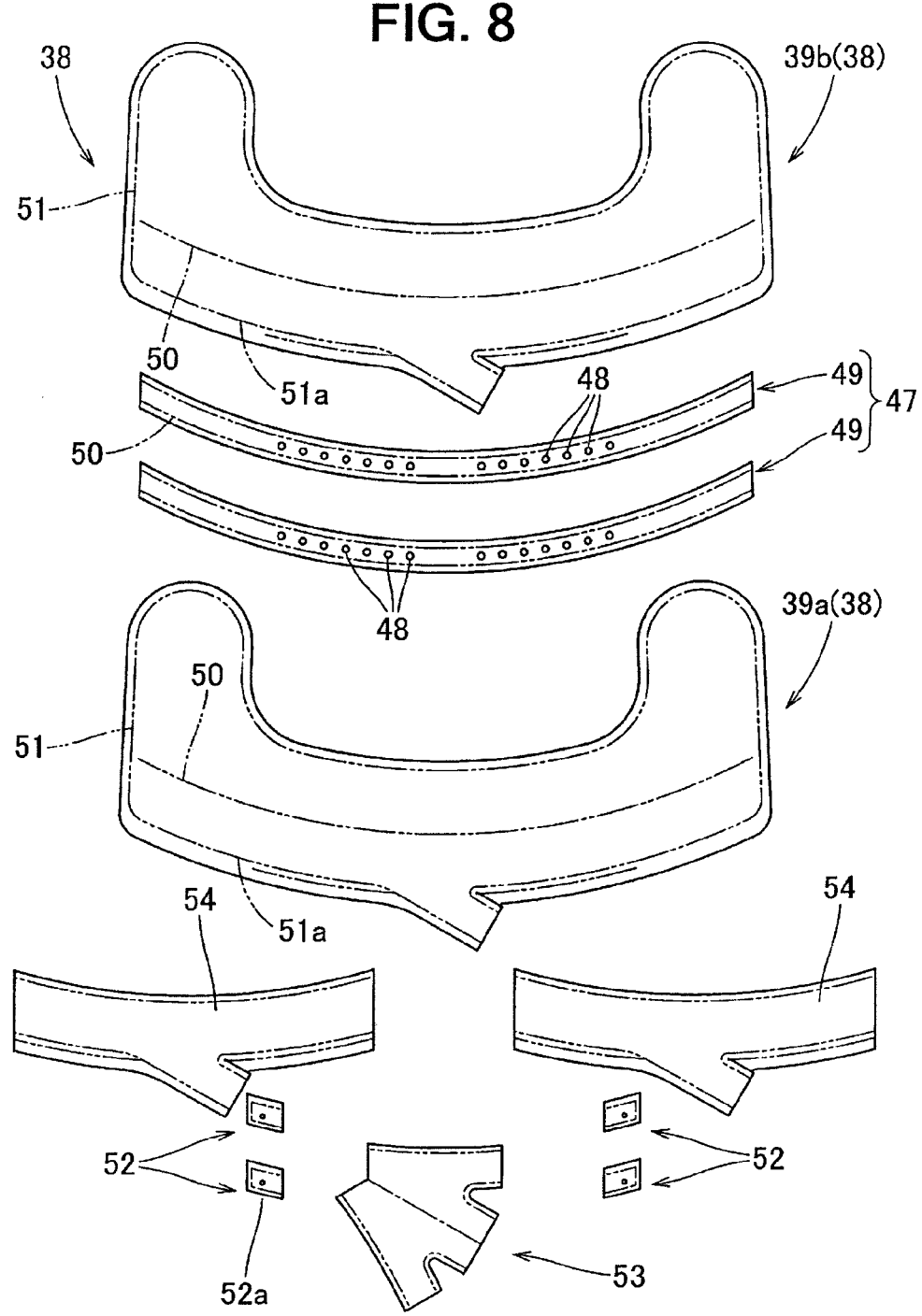
FIG. 8 is a plan view showing base materials constituting the airbag of FIG. 6 arranged side by side.

The airbag 38, as shown in FIGS. 6 to 8, includes a sack-shaped bag body 39, which can be inflated as the inflation gas is flowed thereinto, a tether 47 arranged in a transversal inflation portion 40 (described below) of the bag body 39, a connecting piece 52 for attaching the bag body 39 to the case 26, and an inner tube 53 arranged in the bag body 39.

As shown by a two-dot chain line in FIG. 1 and also shown in FIG. 6, the bag body 39 has a shape upon completion of inflation, which is formed in a generally U shape having a broad width in the left and right direction as viewed from the front. The airbag 39 includes the transversal inflation portion 40 arranged substantially along the left and right direction to extend along the lower portion 4a of the front pillar shield 4 upon completion of inflation, two longitudinal inflation portions 44 and 44 adapted to extend from both ends of the transversal inflation portion 40 toward the rear side and to cover the frond surface side of the front pillars 5L and 5R, and the gas inlet 45 formed to protrude from the substantially middle portion in the left and right direction of a front edge 40a of the transversal inflation direction 40 and connected to the inflator 32. In the embodiment, as shown in FIG. 8, the bag body 39 has a lower wall portion 39a adapted to be arranged on a lower surface side upon completion of inflation and an upper wall portion 39b adapted to be arranged on an upper surface side, and the wall portions have substantially the same exterior shape. The bag body 39 is formed in a sack shape by stitching (coupling) peripheral edges of the lower wall portion 39a and the upper wall portion 39b to each other over the entire periphery except for a distal end 45a of the gas inlet 45 using a stitching thread, and thus forming a peripheral coupling portion 51 (see FIGS. 6 and 7).

Specifically, the transversal inflation portion 40 is configured to cover an upper surface side of a region extending from the cowl 7 to the lower portion 4a of the front pillar shield 4, including the wipers 8 and 8, upon completion of inflation, and a shape thereof upon completion of inflation is configured in a curved rod shape in the left and right direction to conform to the curved shape of the rear end 10c of the hood panel 10, so that the middle thereof in the left and right direction is located on the front side and both left and right ends are located on the rear side. In the embodiment, the transversal inflation portion 40 is bisected into a front section 41 and a rear section 42 along the front and rear direction by arranging the tether 47 therein. As described below, the tether 47 is arranged to be curved substantially along the curved shape of the transversal inflation portion 40 at the substantially middle portion in the front and rear direction of the transversal inflation portion 40. Each of The front port 41 and the rear section 42 is adapted such that a width dimension thereof in the front and rear direction is constant over the entire region in the left and right direction, and is arranged over the entire region in the left and right direction of the transversal inflation portion 40.

The longitudinal inflation portions 44 and 44 have a width dimension (width dimension in the left and right direction) in a flatly deployed state set slightly smaller than the width dimension (width dimension in the front and rear direction) of the transversal inflation portion 40 in a flatly deployed state, and are configured to cover the front surfaces of the front pillars 5L and 5R upon completion of inflation. Specifically, each of longitudinal inflation portions 44 has a length dimension set to a dimension covering the front surfaces of the front pillars 5L and 5R over the substantially entire region.

The gas inlet 45 is formed to protrude from the front edge 40a of the transversal inflation portion 40 forward, and the distal end 45a thereof is opened to be connected to the inflator 32. Namely, according to the airbag 38 of the embodiment, the inflator 32 is arranged near the front end of the transversal inflation portion 40 and the inflation gas G discharged from the inflator 32 is firstly flowed into the front section 41 of the transversal inflation portion 40 through the gas inlet 45. In other words, according to the airbag 38 of the embodiment, in the front section 41 located on the front edge 40a side of the transversal inflation portion 40, the middle part thereof in the left and right direction, which is located near the gas inlet 45, becomes an upstream section 40b in a stream of the inflation gas G discharged from the inflator 32. Specifically, according to the airbag 38 of the embodiment, the upstream section 40b is constituted by a region located more forward than a straight line SL 1 (see FIG. 6) along the left and right direction connecting intersection points between fold lines VL1 and VL2 along the front and rear direction, which are formed upon shrinking and folding in the left and right direction, and a front section 51a (a section forming the front edge 40a of the transversal inflation portion 40) of the peripheral coupling portion 51, at which the outer periphery of the airbag 38 is stitched, in the transversal inflation portion 40 of the airbag 38 in a flatly deployed state.

Also, in the embodiment, the gas inlet 45 is configured in a generally barrel shape arranged to be inclined in the front and rear direction, so that a root part thereof is communicated with the substantially middle part in the left and right direction of the front section 41 of the transversal inflation direction 40 and the distal end 45a thereof is oriented to the left direction. According to the airbag 38 of the embodiment, the inner tube 53, which is separated from the bag body 39, is arranged inside the bag body 39 to protect the gas inlet 45 and a region of the front section 41, which is adjacent to the gas inlet 45 (see FIG. 6). The inner tube 53 includes a part covering an inner periphery of the gas inlet 45 and a part disposed inside the front section 41 on the middle part thereof in the left and right direction, and the parts are communicated with each other to cover an inner periphery extending from the gas inlet 45 to near the middle in the left and right direction of the front section 41. The part disposed in the front section 41 is configured in a generally barrel shape opened on both sides in the left and right direction.

The tether 47 has a band shape continuously arranged over the substantially entire region along the left and right direction at a location in the region of the transversal inflation portion 40 in the bag body 39, which corresponds to the substantially middle part in the front and rear direction, and an upper edge and a lower edge thereof are respectively stitched and connected to the upper wall portion 39b and the lower wall portion 39a of the bag body 39, using a stitching thread, to form a stitched section 50. The tether 47 is arranged to restrict a thickness of the transversal inflation portion 40 upon completion of inflation so that the transversal inflation portion 40 upon completion of inflation can broadly cover the upper surface side extending the cowl 7 to the lower portion 4a of the front pillar shield 4 in the front and rear direction. Specifically, the tether 47 is arranged in the transversal inflation portion 40, to have small gaps 43 and 43 (see FIG. 6) between left and right edges of the transversal inflation portion 40 and the tether 47, and also to be curved so that the middle thereof in the left and right direction is located on the front side and both left and right ends thereof are located on the rear side to extend along the transversal inflation portion 40. The gaps 43 are intended to allow a surplus inflation gas flowed into the front section 41 of the transversal inflation portion 40 to be escaped out, and are opened in a range that does not hinder supporting of the longitudinal inflation portions 44 at initial inflation. Also, in the embodiment, the tether 47 is bisected into upper and lower parts, and thus is constituted of two sheets of tether base fabrics 49 and 49 (see FIG. 8).

A plurality of communication holes 48 for communicating the front section 41 with the rear section 42 are formed in parts of the tether 47, which are disposed inner in the left and right direction than the longitudinal inflation portions 44 and 44 upon completion of inflation of the bag body 39. In the embodiment, the communication holes 48 are arranged a region, which is located inner in the left and right direction than the fold lines VL1 and VL2 (see FIG. 6) formed when the bag body 39 is folded to reduce a width dimension in the left and right direction and then is received in the case 26, and also a region except for the vicinity of the middle in the left and right direction in which the inner tube 53 is arranged. Specifically, each of communication holes 48 is formed to be opened in a generally circular shape, and 7 holes on each of left and right sides of each of tether base fabrics constituting of the tether 47, i.e., a total of 28 holes are formed (see FIG. 8). The communication holes 48 are configured such that the sum of opening areas thereof is substantially the same as a cross-sectional area of the vicinity (the vicinity of a root portion 44b) of a connection part of the longitudinal inflation portions 33 to the transversal inflation portion 40 upon completion of inflation. Also, in the embodiment, each two of the communication holes 48, which are arranged inner in the left and right direction, are disposed at a location overlapped with the inner tube 53 in the front and rear direction.

The connecting pieces 52 for connecting the bag body 39 to the case 26 are formed to extend from the front edge 40a of the transversal inflation portion 40 forward, and in the embodiment, are disposed at two locations which corresponds to both left and right sides of the gas inlet 47. The connecting pieces 52 and 52, as shown in FIG. 5, are fixed to the bottom wall portion 28 of the case 26 by bolts 56, and thus have a insertion hole 52a, through which the bolts 56 can be inserted. Specifically, each of connecting pieces 52 is configured to be arranged at a location which is located inner in the left and right direction than the longitudinal inflation portions 44 and also near both left and right ends of the bottom wall portion 28 when being received in the case 26. The bag body 39 is folded to form the fold lines VL1 and VL2 (see FIG. 6) along the front and rear direction at locations, which are located outer in the left and right direction than the connecting pieces 52, so that the width dimension in the left and right direction can be reduced.

Also, according to the bag body 39 of the embodiment, in the middle region in the left and right direction of the front section 41 of the transversal inflation portion 40, a reinforcement fabric 54 is arranged on an outer periphery of each of the upper wall portion 39b and the lower wall portion 39a to be overlapped with each of the upper wall portion 39b and the lower wall portion 39a (see FIGS. 6 and 7). Specifically, the reinforcement fabric 54 is arranged on parts between the connecting pieces 52 and 52 to cover from the front section 41 of the transversal inflation portion 40, including the upstream section 40b, to upper and lower surface sides of the gas inlet 45 over the substantially entire region thereof. Also, the reinforcement fabric 54 is connected to the upper wall portion 39b and the lower wall portion 39a by stitching a front edge side and a rear edge side thereof together on the peripheral coupling portion 51 forming the outer periphery of the bag body 39 or on the stitched section 50, in which the upper edge and the lower edge of the tether 47 are stitched on the upper wall portion 39b and the lower wall portion 39a.

In the embodiment, the bag body 39, the tether 47, the inner tube 53, the connecting pieces 52 and the reinforcement fabrics 54 are formed of a coated fabric, in which a coating agent for preventing gas leakage is applied on a woven fabric, such as a polyester yarn or a polyamide yarn.

Figure 9A:
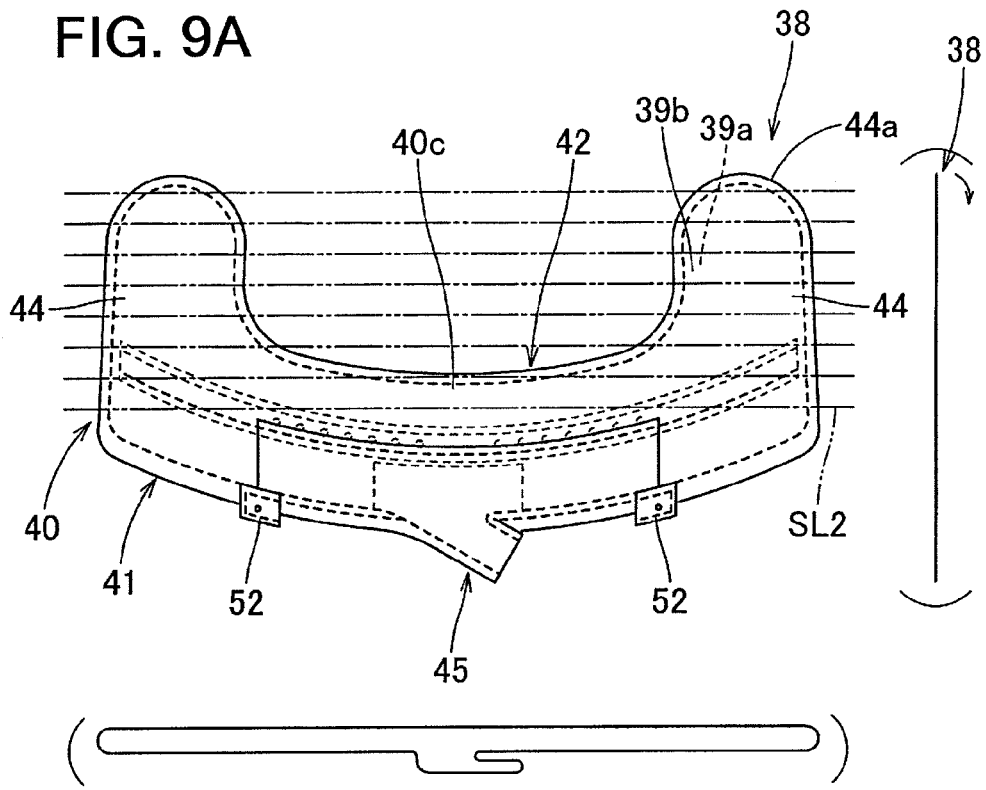
FIGS. 9A and 9B are schematic views explaining a step of folding the airbag of FIG. 6.
Figure 9B:
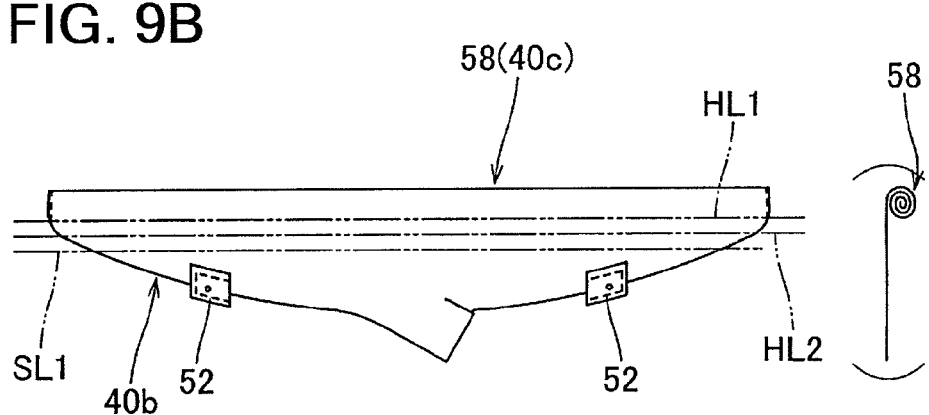

Next, procedures of mounting the airbag apparatus M of the embodiment in the vehicle V will be described. Firstly, the airbag 38 is folded to be receivable in the case 26. In the embodiment, as shown in FIGS. 9A to 10B, the airbag 38 in flatly deployed state, in which the upper wall portion 39b is overlapped with the lower wall portion 39a, is folded by shrinking and folding in the front and rear direction for reducing the width dimension in the front and rear direction, and then by shrinking and folding in the left and right direction for reduce the width dimension in the left and right direction. Specifically, as shown in FIGS. 9A and 9B, the longitudinal inflation portions 44 and a rear edge section 40c of the transversal inflation portion 40 are roll-folded to be rolled from distal ends 44a of the longitudinal inflation portions 44, which becomes a rear end side upon completion of inflation, toward the lower wall portion 39a, thereby forming a roll-folded section 58 (see FIG. 9B). In the embodiment, the rear edge section 40c of the transversal inflation portion 40, in particular as shown in FIG. 6, is constituted by a region located more rearward than a straight line SL 2 (see FIG. 6) along the left and right direction connecting intersection points between fold lines VL1 and VL2 along the front and rear direction, which are formed upon shrinking and folding in the left and right direction, and the stitched portion 50, in which the upper edge and the lower edge of the tether 47 are stitched to the upper wall portion 39b and the lower wall portion 39a of the bag body 39, in the airbag 38 in a flatly deployed state. The airbag 38 is roll-folded in the region, which is located more rearward than the straight line SL2.

Figure 10A:
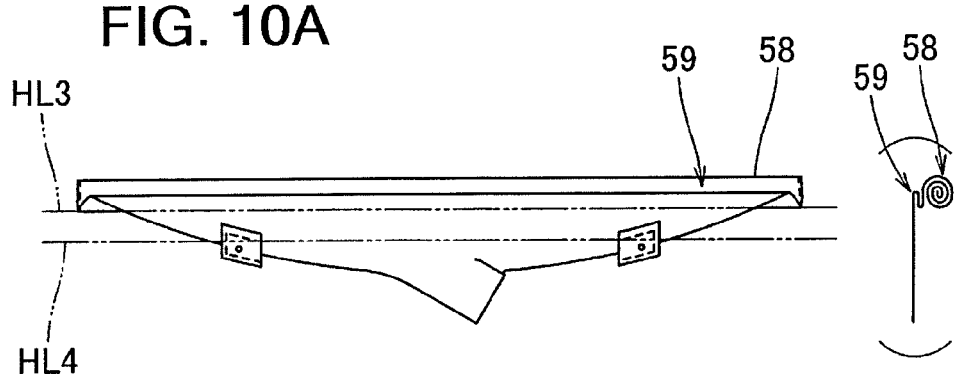
FIGS. 10A to 10C are schematic views explaining a step of folding the airbag of FIG. 6, following the step of FIG. 9.
Figure 10B:
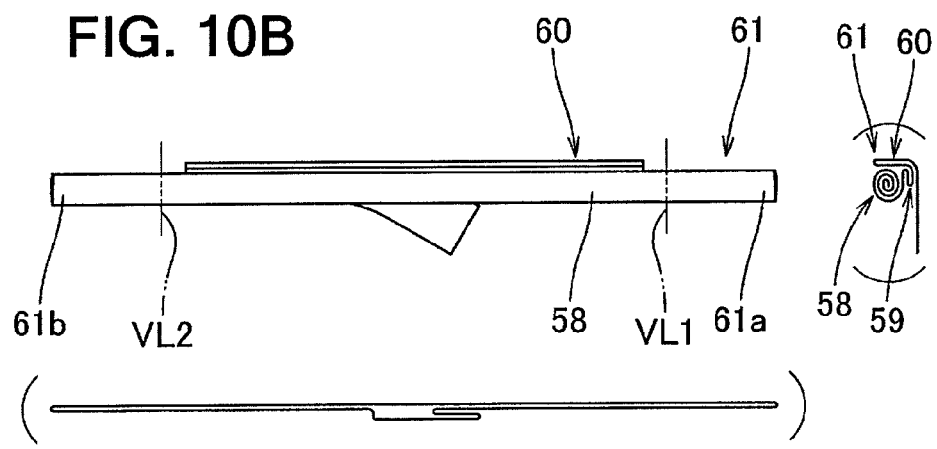

Then, as shown in FIGS. 9B and 10A, a part (the middle part in the front and rear direction) between the rear edge section 40c and the upstream section 40b of the transversal inflation portion 40 is accordion-folded to form two fold lines HL1 and HL2 along the left and right direction, thereby forming an accordion-folded section 59. The accordion-folded section 59 is arranged in front of the roll-folded section 58. Then, as shown in FIGS. 10A and 10B, the upstream section 40b of the transversal inflation portion 40 is folded back to form fold lines HL3 and HL4 substantially along the left and right direction, and thus to be arranged at a location covering lower sides of the roll-folded section 58 and the accordion-folded section 59, thereby forming an underlay section 60. Thus, shrinking and folding in the front and rear direction is completed.

Figure 10C:
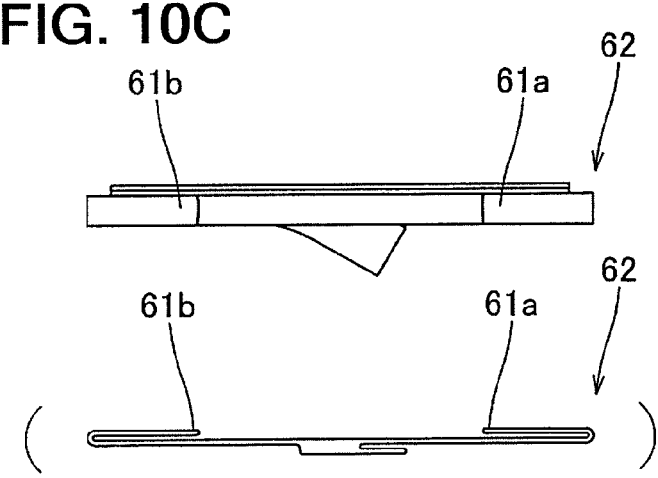

Then, to be receivable in the case 26, the bag 61 shrunk and folded in the front and rear direction is folded back to form the fold lines VL1 and VL2 (see FIG. 10B) along the front and rear direction at locations (locations near the outsides in the left and right direction of the connecting pieces 52 and 52) near inner edges in the left and right direction of the longitudinal inflation portions 44 and 44, so that the both left and right ends 61a and 61b thereof is oriented inward in the left and right direction, thereby completing shrinking and folding in the left and right direction (see FIG. 10C). In this way, the completely folded body 62 receivable in the case 26 is formed. According to the airbag 38 of the embodiment, in a state of the completely folded body 62, the communication holes 48 formed in the tether 47 are arranged over the substantially entire region in the left and right direction, except for a part folded back by shrinking and folding in the left and right direction.

After the airbag 38 is completely folded, a breakable wrapping material (not shown) for preventing collapsing of the folded state is wrapped around the completely folded body 62. In this time, the distal end 45a of the gas inlet 45 and the connecting pieces 52 are left exposed from the wrapping material. Then, the inflator 32 retained by the retainer 33 is connected to the distal end 45a of the gas inlet 45 using the clamp 35, and also the bolts 52 are inserted through the insertion holes 52a of the connecting pieces 52. Next, the inflator 32 and the airbag 39 are received in the case 26 such that each of bolts 34 and 56 protrudes from the bottom wall portion 28 of the case 26, and then, nuts (not shown) are fastened on each of bolts 34 and 56 protruded from the bottom wall portion 28. In this way, the airbag 38 and the inflator 32 can be kept received in the case 26.

Next, the case 26 with the airbag cover 30 attached thereon is attached to the hood panel 10 using brackets (not shown) and the inflator 32 is electrically connected to the activation circuit (not shown). Then, the airbag apparatus M can be mounted in the vehicle V.

In the airbag apparatus M of the embodiment, when the actuation circuit (not shown) detects that the vehicle V is collided with a pedestrian, based on a signal from a sensor (not shown) arranged in the front bumper 6, the actuators 21 are actuated to be pushed up the rear end 10c of the hood panel 10 by the piston rods 23 (see FIG. 11), and thus the gap OS allowing the airbag to protrude out is formed between the rear end 10c of the hood panel 10 and the cowl 7 (see FIGS. 12A to 13B). At the substantially same time, the inflator 32 is activated so that the inflation gas is flowed into the airbag 38, thereby inflating the airbag 38. The inflating airbag 38 pushes and opens the door portion 30a of the airbag cover 30, and then, while obliquely protruding rearward and upward from the protrusion opening 26a of the case 26 formed by opening the door portion 30a, is completely inflated to cover the upper surface of the cowl 7 and the front surfaces of the front pillars 5L and 5R (cf., a two-dot chain line in FIG. 1, and FIGS. 14 and 15).

Figure 12B:
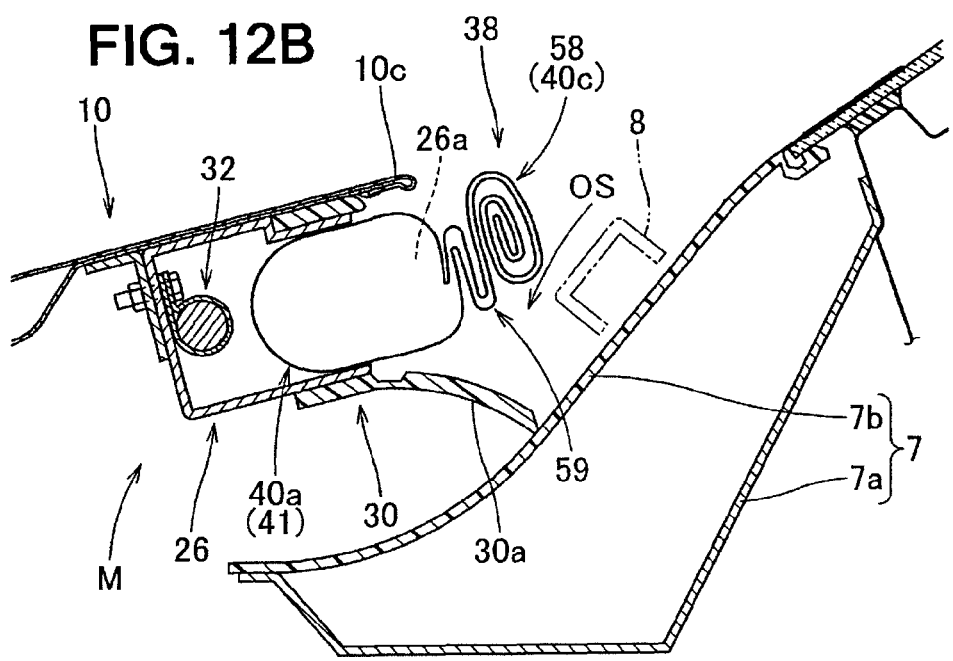
Figure 13A:
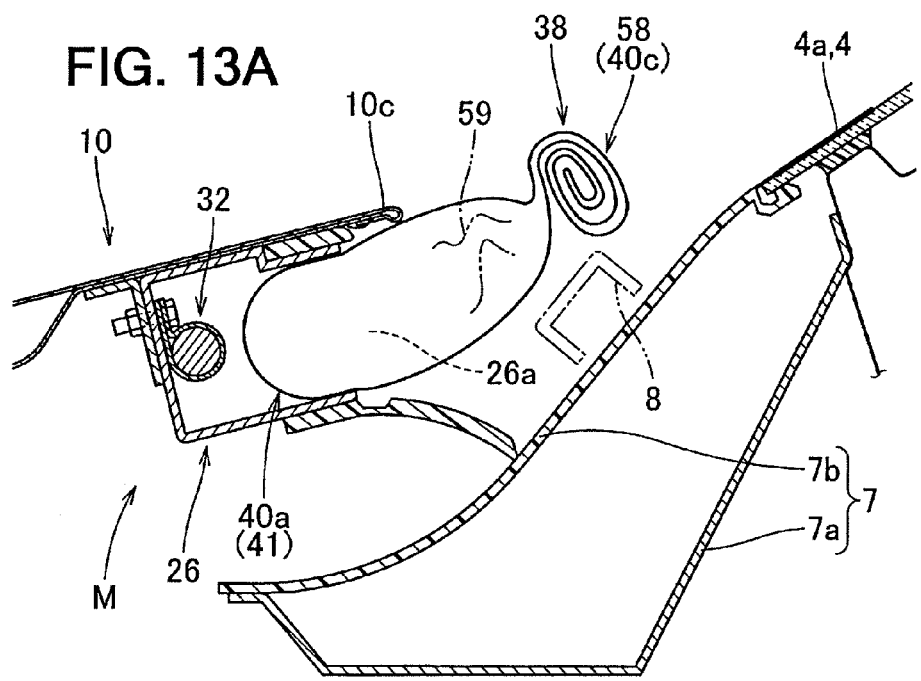
FIGS. 13A and 13B are longitudinal sectional views explaining a procedure of inflating the airbag of the pedestrian airbag apparatus according to the embodiment, following the procedure of FIG. 13.
Figure 13B:
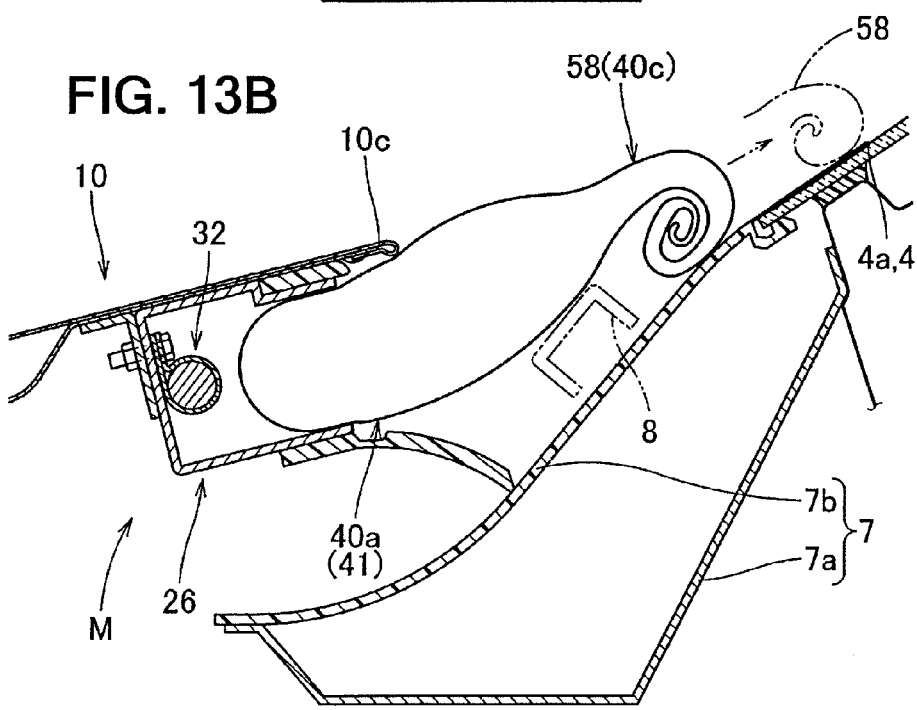
Figure 14:
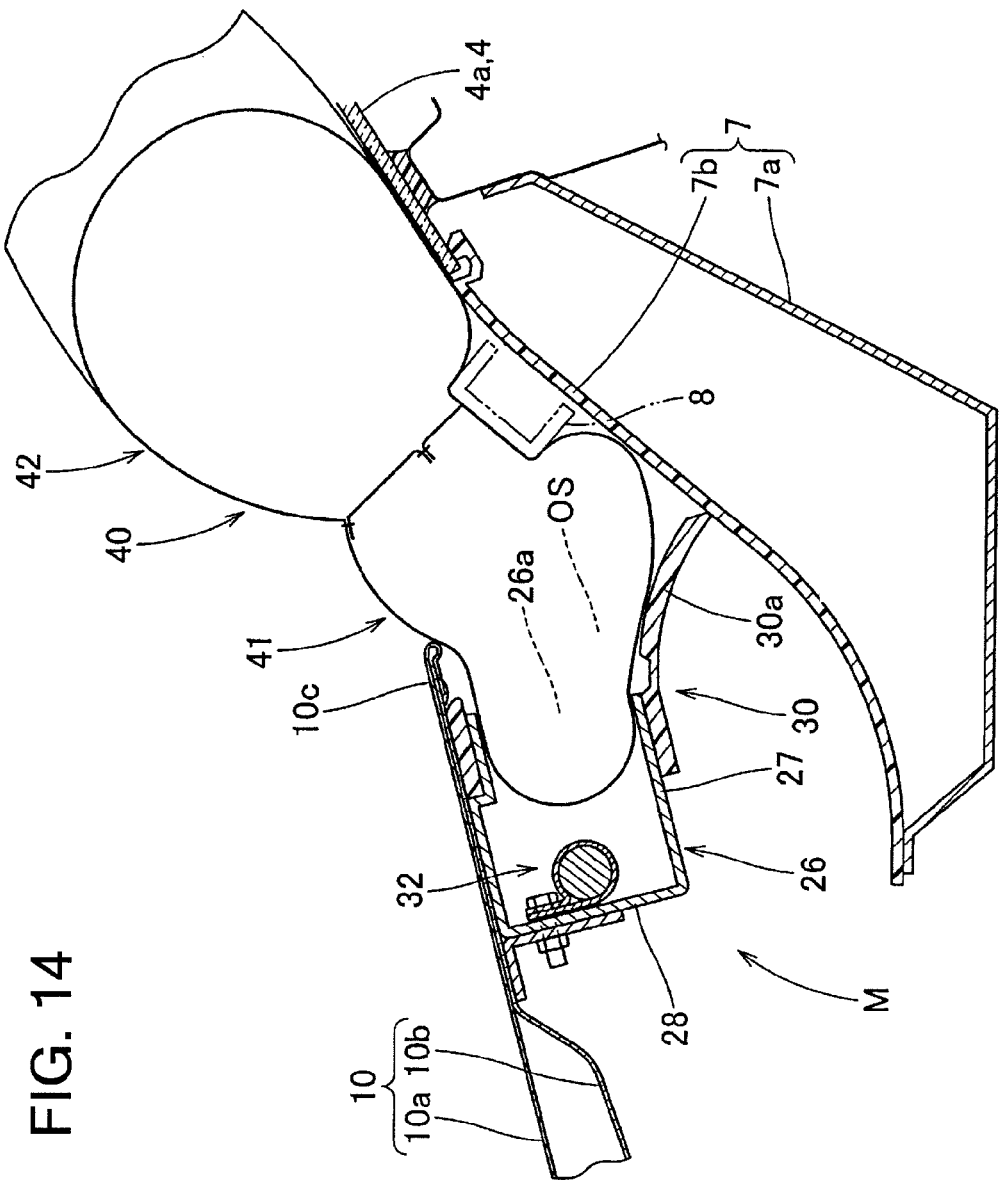
FIG. 14 is a longitudinal sectional view showing a state where the airbag of the pedestrian airbag apparatus according to the embodiment has been completely inflated.

Also, according to the airbag apparatus M of the embodiment, the inflation gas G discharged from the inflator 32 is firstly flowed into the upstream section 40b of the transversal inflation portion 40. Because the upstream section 40b prior to activation is received in the case 23 as the storage portion to be arranged as the underlay section 60 at a location covering the lower sides of the roll-folded section 58 and the accordion-folded section 59, upon initial inflation of the airbag 38, the upstream section 40b is firstly inflated by the inflation gas flowed thereinto and then, as shown in FIG. 12B, pushes out the roll-folded section 58 and the accordion-folded section 59 so that the roll-folded section 58 and the accordion-folded section 59 protrude greatly rearward and upward from the protrusion opening 26a disposed on the rear side of the case 26. Also, according to the airbag apparatus of the embodiment, the rear edge section 40c of the transversal inflation portion 40 is roll-folded to be rolled from the rear end upon completion of inflation toward the lower wall portion 39a, the part between the upstream section 40b and the rear edge section 40c is accordion-folded to form the fold lines substantially along the left and right direction, and also, the accordion-folded section 59 is arranged in front of the roll-folded section 58 (between the roll-folded section 58 and the upstream section 40b). Therefore, after being pushed out from the case 26 by the upstream section 40b, as shown in FIG. 13A, the accordion-folded section 59 is deployed to release the folded state thereof, thereby further pushing out the roll-folded section 58 rearward and upward. As a result, even if the wipers 8 and 8 arranged to protrude upward from the cowl 7 are disposed adjacent to the rear side of the case 26, the roll-folded section 58 can protrude to go over the wipers 8, thereby preventing interference with the wipers 8. Therefore, as shown in FIG. 13B, the roll-folded section 58 can be prevented from being interfered with the wipers 8, and thus be smoothly deployed and inflated to release the folded state thereof.

Therefore, according to the airbag apparatus M of the embodiment, the airbag 38 can be quickly and stably inflated.

Also, according to the airbag apparatus M of the embodiment, the transversal inflation portion 40 is divided by the tether 47 into the front section 41 and the rear section 42 over the substantially entire region in the left and right direction, and the front section 41 and the rear section 42 are communicated with each other by the communication holes 48 formed in the tether 47 at a location, which is located inner than the longitudinal inflation portions 44 and 44. Therefore, the inflation gas flowed into the airbag 38 through the gas inlet 45 firstly inflates the front section 41 of the transversal inflation portion 40 over the substantially entire region in the left and right direction, and then is flowed into the rear section 42 through the communication holes 48 formed in the tether 47. Thereafter, the inflation gas is flowed toward both left and right sides of the rear section 42 to be flowed into the longitudinal inflation portions 44 (cf. two-dot chain lines in FIGS. 6 and 15). Therefore, when the inflation gas is flowed into the longitudinal inflation portions 44 and 44, the front section 42 of the transversal inflation portion 40 previously inflated acts as a generally rod-shaped rigid body, including both left and right ends, and thus becomes an aspect of reinforcing the vicinity of the connection part between the rear section 42 of the transversal inflation portion 40 and each of the longitudinal inflation portions 44. As a result, the vicinity of the connection parts can be supported by the front section 41. Thus, the longitudinal inflation portions 44 and 44 can be prevented from being greatly shaken in the left and right direction and the deploying longitudinal inflation portions 44 and 44 can be inhibited from being greatly shaken in the left and right direction, so that the longitudinal inflation portions 44 and 44 can quickly and stably arranged to cover the front pillars 5L and 5R.

Further, according to the airbag apparatus M of the embodiment, because the transversal inflation portion 40 is folded by accordion-folding the middle part (a part between the upstream section 40b and the rear edge section 40c) thereof in the front and rear direction, the transversal inflation portion 40 is quickly deployed to release the folded state thereof, after protruding from the case 26. Also, according to the airbag apparatus M of the embodiment, because the upstream section 40b inflated as the inflation gas is initially flowed thereinto is constituted by a part between the fold lines VL1 and VL2 upon shrinking and folding in the left and right direction, even if the airbag 38 is folded and received in the case 26 with an elongated shape in the left and right direction, the accordion-folded section 59 and the roll-folded section 60 can quickly protrude from the protrusion opening 26a of the case 26 over the substantially entire region in the left and right direction, due to the upstream section 40b quickly inflated over the substantially entire region in the left and right direction. Also, according to the airbag apparatus M of the embodiment, because the transversal inflation portion 40 is folded to form the fold lines HL1, HL2, HL3 and HL4 along the left and right direction, so that a region (the entire region of the front section 41 and portions on both left and right sides of the rear section 42) thereof, except for the middle region in the left and right direction near the rear edge of the rear section 42 constitutes the underlay section 60 and the accordion-folded section 59, upon initial inflation of the airbag 38, the transversal inflation portion 40 can quickly deployed over the substantially entire region in the left and right direction so that the front section 41 is quickly inflated in a rod shape extending substantially along the left and right direction, ant then the longitudinal inflation portions 44 are deployed to release the roll-folded state thereof. Therefore, even if the transversal inflation portion 40 has an elongated shape substantially along the left and right direction and also is curved in the left and right direction, the transversal inflation portion 40 can be prevented from being twisted in the middle part thereof or parts near the longitudinal inflation portions 44 and 44, which are disposed on both left and right end sides, and thus the longitudinal inflation portions 44 disposed on both left and right end sides can be also smoothly deployed to release the folded state.

In addition, because each of the longitudinal inflation portions 44 is folded by roll-folding to roll from the distal ends 44a toward the lower wall portion 39a, the longitudinal inflation portions 44 are deployed along the front surfaces of the front pillars 5L and 5R to release the rolls, and upon deployment and inflation, are prevented from being floated from the front pillars 5L and 5R. Therefore, the longitudinal inflation portions 44 can be quickly inflated to cover the front pillars 5L and 5R.

Meanwhile, although the case 24 (storage portion) is configured such that the peripheral wall portion 27 is arranged to extend substantially along the front and rear direction and the protrusion opening 26a for protruding the airbag is arranged on the rear end side thereof, a configuration, in which a case is obliquely arranged in the upward and downward direction and a protrusion opening is arranged on a rear upper end side thereof, or a configuration, in which a peripheral wall portion is arranged to extend substantially along the upward and downward direction and a protrusion opening is arranged on an upper end side, may be employed as the case.

Also, although, in the embodiment, the airbag apparatus M mounted in the vehicle V of the type having the actuator 21 for pushing upward the rear end 10c of the hood panel 10 has been described as an example, the present invention can be applied to a pedestrian airbag apparatus, which does not have an actuator and thus is configured such that a rear end of a hood panel can be pushed up by an inflating airbag itself. In addition, because the airbag apparatus M of the embodiment is attached to the lower surface of the hood panel 10 itself so that, upon actuation of the actuator 21, the airbag apparatus M is raised together with the rear end 10c of the hood panel 10, the airbag 39 can smoothly go over the wipers 8 and thus quickly be inflated, even if the wipers 8 greatly protrude from the upper surface of the cowl 7. Of course, the position, in which the airbag apparatus is arranged, is not limited to the embodiment, and accordingly, the present invention may be applied to, for example, an airbag apparatus, which is attached to a part of a cowl near a rear end of a hood panel.

What is claimed is:

1. A pedestrian airbag apparatus received in a storage portion arranged near a rear end of a hood panel of a vehicle in a middle part in a left and right direction between a left front pillar and a right front pillar, the pedestrian airbag apparatus comprising:
an airbag that is folded; and
an inflator that supplies an inflation gas to the airbag,
wherein the airbag protrudes from the storage portion when an inflation of the airbag is started and includes:
a transversal inflation portion that is formed in a generally rod-shape extending along a left and right direction of a lower portion of a front windshield which is arranged on a rear side of the hood panel in a state where the inflation of the airbag is completed; and
two longitudinal inflation portions that are formed in a shape extending rearward from both ends of the transversal inflation portion in the left and right direction to cover front surfaces of the left and right front pillars,
wherein the inflator is connected to a vicinity of a front end of the transversal inflation portion,
wherein the airbag is formed in a sack shape including a lower wall portion arranged on a lower surface side thereof in a state where the inflation of the airbag is completed and an upper wall portion arranged on an upper surface side thereof in the state where the inflation of the airbag is completed,
wherein the lower wall portion has substantially the same exterior shape as the upper wall portion,
wherein the airbag is folded from a flatly deployed state, in which the upper wall portion is overlapped with the lower wall portion, to be receivable in the storage portion, by folding in a front and rear direction for reducing a width dimension thereof in the front and rear direction, and by folding in the left and right direction for reducing a width dimension thereof in the left and right direction,
wherein, upon completion of inflation in the transversal inflation portion, the middle part in the left and right direction of a front edge side thereof upon completion of inflation is constituted as an upstream section in a stream of the inflation gas discharged from the inflator, and
wherein, during the folding in the front and rear direction of the airbag, the transversal inflation portion is folded by roll-folding to roll a rear edge section of the transversal inflation portion from a rear end of the airbag in the state where the inflation of the airbag is completed toward the lower wall portion, accordion-folding another section of the transversal inflation portion between the upstream section and the rear edge section to form fold lines substantially along the left and right direction, arranging the accordion-folded section formed by the accordion-folding in front of the roll-folded rear edge section formed by the roll-folding, and then folding back the upstream section to form fold lines substantially along the left and right direction and thus to be arranged at a location covering lower sides of the accordion-folded section and the roll-folded section.

* * * * *